Patented Apr. 20, 1937

2,077,421

UNITED STATES PATENT OFFICE 2,077,421

CATALYTIC HYDROGENATION PROCESS

Wilbur Arthur Lazier, Elmhurst, Del., assignor to E. I. du Pont de Nemours & Company, Wilmington, Del., a corporation of Delaware No Drawing. Application May 27, 1930, Serial No. 456,298

29 Claims. (Cl. 260—54)

This invention relates to catalytic processes, and more particularly to processes for the liquid phase hydrogenation of carbon compounds by means of metallic hydrogenating catalysts prepared by the reduction, or ignition and reduction, of chromates, molybdates, and similar salts.

Considerable work has been done in the field of catalytic chemistry with a view to developing improved catalysts for the hydrogenation of such unsaturated compounds as the olefins, unsaturated fats and fatty acids, benzene and its derivatives, and a large number of other compounds containing unsaturated functions, such as the aldehydes, nitriles, amides, and heterocyclic unsaturated rings. Most of this work has been based upon the classical discovery of Sabatier that finely divided metallic nickel is capable of causing the union of hydrogen with these compounds. The method has been further expanded and supplemented by the work of Ipatief on the application of high pressures to these reactions.

Extensive research has been carried out heretofore with the result that several different methods for the prepartion of hydrogenation catalysts have been developed, the most common of which involve the precipitation and reduction of nickel hydroxide or carbonate, the reduction of nickel oxide prepared by ignition of the nitrate, anodic oxidation followed by reduction, heating certain organic salts of nickel to their decomposition temperature, and electrochemical deposition of metallic nickel.

Furthermore, various methods of reduction have been proposed, ranging from the ordinary dry reduction with hydrogen to reduction in an inert liquid vehicle or in the presence of the oil or other substance undergoing hydrogenation. As is well known, these catalysts have found extensive use in the commercial hydrogenation of fats, oils, and similar readily hydrogenated substances. I have found, however, that in general catalysts prepared by the above methods, although ordinarily suitable for the hydrogenation of fats and oils, may be entirely inadequate for the more difficult hydrogenation of such compounds as aldehydes, ketones, sugars, phenols, furfural and its derivatives, or benzene and pyridine and their homologues. Although many types of nickel catalysts have been used for various liquid or vapor phase hydrogenations, so far as I am aware, a pure alkali-free nickel catalyst prepared by the reduction, or ignition and subsequent reduction, of chromates, molybdates, or other compounds of this type, has never heretofore been employed for hydrogenations in the liquid phase.

This invention accordingly has as an object to provide a process for the hydrogenation of carbon compounds in the liquid phase by the use of highly efficient hydrogenating metal catalysts prepared by reducing a composition comprising an oxide of a hydrogenating metal combined with a more acidic oxide such as chromate, molybdate, or similar salt. A further object is to provide such a process involving the use of reduced alkali-free hydrogenating catalysts of the above type. A specific object is to carry out the liquid phase hydrogenation of organic compounds capable of hydrogenation by the use of catalysts prepared by reducing nickel chromate to nickel chromite by means of the action of heat alone or of heated hydrogen, or ignition of the chromate to chromite, followed by a further reduction of at least a part of the nickel compounds to elementary nickel.

A preferred object of the invention relates to the hydrogenation of furfural, preferably in a liquid phase, in the presence of catalysts containing chromites of hydrogenating metal catalysts.

These objects are accomplished by the following invention, which in its general aspects, comprises the employment in liquid phase hydrogenations of catalysts prepared either by reducing a salt consisting of a combination of an oxide of one of the hydrogenating metals, such as nickel, copper, cobalt, and iron, with a more acidic oxide, such as one of the oxides of the elements contained in the fifth and sixth groups of the Periodic Table, typified by chromium; or by first igniting one of these salts to form an oxide composition containing chromium or molybdenum in trivalent form, and then reducing this compound. Ignition of the combined salt to convert the metal of the more acidic oxide to a lower valence constitutes a species of reduction, further reduction of the salt being accomplished by contact with hydrogen. The object of the reduction by hydrogen in either case is to obtain the hydrogenating component in the form of a finely divided and highly active metal or metallic oxide.

It seems desirable at this point to discuss briefly the chemistry of the catalytic materials comprising the subject matter of this invention and to indicate several different methods of preparation. These catalysts may be said to consist of a hydrogenating metal or its oxide, either associated or combined with a more acidic metallic oxide. By the term hydrogenating metal, I refer to a metal which is capable of causing the union of hydrogen with a compound capable of hydrogenation with or without the splitting off of water. Included in this group of metals are iron, nickel, cobalt, copper, silver, tin, cadmium, lead, and bismuth.

It has just been stated that the hydrogenating metals are combined or associated with acidic metallic oxides. By the term acidic oxides I refer to those of elements contained in the fifth and sixth groups of the Periodic Table, for example, oxides of chromium, molybdenum, tungsten, vanadium, uranium, and titanium. Among the salts which are especially suitable for the preparation of the hydrogenating catalysts of this invention may be mentioned the chromates and molybdates. These compounds may be prepared by precipitation, fusion, or in other ways well known to those skilled in the art. It is to be noted, however, that treatment of solutions of nickel salts with an equivalent amount of an alkali metal chromate according to prior art practice yields a precipitate of basic nickel chromate that always contains alkali metal chromate which can be leached out only after heating at a temperature sufficient to destroy the nickel chromate.

Certain of the nickel-chromium compounds constitute a convenient starting point from which to prepare efficient hydrogenating catalysts according to the principles of this invention. I have described below several typical methods for the preparation of catalyst compositions in accordance with the principles of my invention.

Taking the preparation of nickel chromite catalysts as typical of the compositions of my invention, it may be stated that there are two general methods of preparation, (1) reduction of a chromate with hydrogen, or (2) ignition of a chromate to a chromite followed by reduction. When prepared by either of these methods the nickel chromate is first converted to a chromite composition which may be considered to consist of nickel oxide (NiO) and nickel chromite (NiCr$_2$O$_4$) in which chromium is in the trivalent form. This composition is then further reduced to a composition consisting of metallic nickel, nickel oxide, and nickel chromite.

In order to classify these compounds under a generic term regardless of their method of preparation, they may be designated nickel-chromium oxide catalysts, or nickel chromites. However, by the term chromite I do not intend to define these compositions as definite chemical compounds, but as compositions in which the catalytically active component is a hydrogenating metal which may be either combined or associated with a more acidic oxide in a lower stage of oxidation. The hydrogenating metal may exist, either in the metallic form or as an oxide, or both, the chemical relationships of the various elements of the composition depending to a certain extent upon the methods of preparation and reduction employed. According to my preferred methods of preparation the total nickel oxide component of the chromite is only partially reduced with the result that the composition contains, as indicated above, three components, i. e., finely divided, reduced, metallic nickel, nickel oxide, and nickel chromite.

The following typical methods have been found suitable for the preparation of chromite catalysts and especially for their preparation in an alkali-free condition:

(1) Sodium chromate and nickel sulphate solutions are allowed to react to form a brown precipitate of basic nickel chromate containing some sodium chromate. The resulting solution is filtered and the precipitate washed, dried, and ignited at a mild red heat. The washing of the precipitate removes the greater portion of the sodium chromate and nickel sulfate carried down by the precipitate. However, the sulfate ion is extremely difficult to eliminate, and the washing step, even when the precipitate is thoroughly washed, leaves traces of sulfate in the washed precipitate. After cooling, the black residue containing partially combined nickel oxide and chromium oxide is extracted with hot water to remove any remaining alkali chromate. This oxide mixture is then reduced with hydrogen.

(2) Nickel oxide or carbonate is digested with chromic acid until completely dissolved. On evaporating the solution to dryness, the residue is reduced with hydrogen, or is first heated to redness, representing a temperature in the vicinity of 800° C., to convert it to the chromite form, followed by hydrogen reduction.

These compositions, typified by the chromates, may be ignited at temperatures ranging preferably from 600–800° C., although higher temperatures may be employed in special cases. Reduction of the ignited composition is then carried out preferably at a temperature of 500° C. The chromate may also be reduced directly at 500° C. without previous ignition, but I prefer to first ignite the material since the resulting catalyst is more compact and convenient to handle. During the ignition of the class of compounds exemplified by the chromates, the chromium or like metal is reduced to the trivalent form, the nickel remaining at this stage of the preparation as nickel oxide. Further reduction by means of hydrogen reduces at least a part of the combined nickel to the active metallic form. It is also to be noted that simple hydrogen reduction of the chromate itself will eventually accomplish the same result.

I prefer to reduce salts of the ferrous metal group with hydrogen at temperatures of from 400–600° C., preferably at 500° C. Somewhat lower temperatures suffice for reduction of the non-ferrous hydrogenating metals.

The proposed methods of catalyst preparation have several advantages. Not only is the catalyst very active, but it is also more capable of withstanding catalyst poisons, such as oxygen and sulphur, than known types of catalysts. This is presumably because of the potential supply of unreduced nickel or other catalytic hydrogenating metal which may be continuously activated under the conditions of hydrogenation. When badly poisoned the supporting oxide (for example, chromium oxide) facilitates regeneration, which is brought about by gentle ignition followed by reduction. Another advantage is that the materials of this invention lend themselves very readily to compression into a form that may be used in a continuous operation wherein the liquid to be hydrogenated is permitted to flow over the contact mass in the presence of hydrogen under pressure. Nickel and copper chromites, for example, are readily briquetted with the ordinary types of pharmaceutical tablet machinery without injury to the porosity or activity of the catalyst. It will be apparent that a continuous method of operation employing the catalysts of this invention offers many advantages over the usual autoclave process.

Having outlined above the general principles of my invention, the following examples which are included merely for purposes of illustration and not as a limitation, disclose specific methods used in carrying the invention into practice and the improved results accruing from its use.

*Example 1.*—228 grams of pure nickel hydroxide was suspended in water and treated with 200 grams of chromic anhydride. The resulting paste was filtered, dried and ignited four hours at 400° C. 5 grams of the residual nickel chromite composition was reduced 24 hours with hydrogen at 500° C. The resulting mass was cooled and transferred without exposure to air to a vessel containing 200 cc. of crude synthetic higher alcohols (boiling range 100–135° C.) prepared by the high pressure dehydrogenation of ethanol and containing, in addition to butanol, about 20% of unsaturated compounds such as crotonyl alcohol and 30–40% of esters, including butyl acetate and ethylbutyrate. After agitating the mixture for two hours at 150° C. under a hydrogen pressure of 400 pounds, the iodine number of the mixture had dropped from 99 to 33, indicating saturation of the compounds containing unsaturated bonds, with a resultant improvement in the quality of the product for solvent purposes.

*Example 2.*—290 grams of nickel nitrate was dissolved in two liters of water and treated with an equal volume of water containing 194 grams of potassium chromate. The mixture was heated to 90° C. and treated with a solution containing 56 grams of potassium hydroxide. The precipitate was decanted, washed, dried, and heated at a dull red heat for four hours, after which it was cooled and again washed to free it from the last of the potassium chromate set free by the ignition. 10 grams of this alkali-free nickel-chromium oxide composition was then reduced with hydrogen at 500° C. and employed for the hydrogenation of cotton seed oil. After stirring 200 cc. of the oil with the reduced catalyst at 170° C. under 600 pounds hydrogen pressure for one hour, the melting point of the fat was found to have been raised to 65° C.

*Example 3.*—Mesityl oxide was agitated for two hours in the presence of a nickel-chromium oxide catalyst prepared by the reduction of nickel chromate as described in method 2 above under a hydrogen pressure of 1700 pounds. Hydrogen began to be absorbed at 140° C. and the reaction became rapid at 160–180° C. After cooling and separating the catalyst from the liquid products, 75% of the liquid distilled at 118–121° C., the boiling point of methyl isobutyl ketone.

*Example 4.*—An 85% solution of phenol in water was charged into a high pressure autoclave with such an amount of the nickel-chromium oxide catalyst, prepared as indicated in Example 1, as contained elementary nickel equal to 1% of the phenol treated. The mixture was heated and agitated for two hours with pure hydrogen at 800 pounds pressure. Hydrogenation began at 120° C. and was quite rapid at 170° C. Pure cyclohexanol only was formed under these conditions. The yield was quantitative.

*Example 5.*—100 grams of furfural and 13 grams of water were shaken vigorously with 7 grams of a nickel chromite catalyst prepared by the reduction of nickel chromate with hydrogen at 450–500° C. under 1400 pounds hydrogen pressure and at a temperature of 80–110° C. The yield of tetrahydrofuryl alcohol was about 65%.

*Example 6.*—Nickel molybdate was formed by treating a warm dilute solution of nickel nitrate with a solution containing an equivalent amount of ammonium molybdate. The acid formed during the reaction was neutralized by the addition of ammonium hydroxide. The precipitate was then filtered, washed, dried and reduced with hydrogen at 450° C. 150 grams of mesityl oxide was shaken with 5 grams of the reduced catalyst under 1500 pounds hydrogen pressure for three hours at 150° C. The product was cooled and distilled. The boiling point was found to be 115–120° C. indicating practically quantitative conversion to methyl isobutyl ketone.

The above examples illustrate applications of the improved catalysts of my invention to certain typical liquid phase hydrogenations, but it is to be understood that they may be employed in many other reactions of this general class. For example, crude metacresol, known commercially as cresylic acid, may be effectively hydrogenated at about 200° C., using the same catalyst as in Example 4. In this case, however, owing to the presence of catalyst poisons, it is advisable to purify the cresylic acid before use by treatment with a spent catalyst.

Similarly, beta naphthol may be readily hydrogenated to yield the corresponding tetrahydro and decahydro derivatives. In like manner, crotonic aldehyde yields butyraldehyde and butanol when hydrogenated under the influence of the catalyst described in Example 5, the percentage of each depending upon the conditions of operation such as temperature, pressure, time of reaction, and agitation. The conditions of operation will, of course, vary considerably with the compound to be treated and the particular catalyst selected for any given reaction.

As many apparently and widely different embodiments of this invention may be made without departing from the spirit and scope thereof, it is to be understood that I do not limit myself to the specific embodiments thereof except as defined in the appended claims.

I claim:

1. In a catalytic process of hydrogenating an organic compound capable of hydrogenation, the step which comprises contacting said compound in the liquid state, in the presence of hydrogen, with a catalyst comprising essentially an oxide of a metal selected from the group consisting of iron, nickel, cobalt, copper, silver, tin, cadmium, lead, and bismuth chemically combined with an oxide of a metal selected from the group consisting of chromium, molybdenum, tungsten, vanadium, and uranium, said catalyst being prepared by partially reducing a composition in which at least one of the metal oxides are in a higher state of oxidation.

2. In the process of hydrogenating an unsaturated organic compound in the liquid phase, the step which comprises bringing a mixture of said compound in the liquid state and hydrogen into contact with a catalyst comprising essentially an oxide of a metal selected from the group consisting of iron, nickel, cobalt, copper, silver, tin, cadmium, lead, and bismuth chemically combined with an oxide of a metal selected from the group consisting of chromium, molybdenum, tungsten, vanadium, and uranium, said catalyst being prepared by partially reducing a composition in which at least one of the metal oxides are in a higher state of oxidation.

3. The process of claim 2 in which the catalyst is an alkali-free composition prepared by partially reducing a chromate of a hydrogenating metal.

4. The process of claim 2 in which the catalyst is an alkali-free composition prepared by heating a chromate of a hydrogenating metal to form a chromite and partially reducing said chromite.

5. The process of claim 2 in which the catalyst is an alkali-free composition prepared by heating nickel chromate to form nickel chromite and partially reducing said nickel chromite with hydrogen.

6. The process of claim 2 in which the catalyst is an alkali-free composition prepared by heating nickel chromate at a temperature of at least 500° C. and reducing the ignited composition in hydrogen at a temperature of 400–500° C.

7. The process of hydrogenating crude synthetic butyl alcohol prepared by the pressure dehydrogenation of ethanol and containing unsaturated organic compounds, which comprises agitating said alcohol with hydrogen under a pressure of 400 pounds at a temperature of 150° C. in the presence of a catalyst prepared by heating nickel chromate at a temperature of 400° C. and then partially reducing the chromite with hydrogen at 500° C.

8. The process of hydrogenating an organic compound which is structurally capable of hydrogenation which comprises contacting such compound in the liquid phase in the presence of hydrogen with a catalyst comprising essentially a chromite of a hydrogenating metal selected from the group consisting of iron, nickel, cobalt, copper, silver, tin, cadmium, lead and bismuth.

9. The process of hydrogenating an organic compound which is structurally capable of hydrogenation which comprises contacting such compound in the liquid phase in the presence of hydrogen with a catalyst comprising essentially a chromite of a hydrogenating metal selected from the group consisting of iron, nickel, cobalt, copper, silver, tin, cadmium, lead and bismuth prepared by partially reducing the corresponding chromate.

10. The process described in claim 2 in which the catalyst is prepared by partially reducing a chromate of a hydrogenating metal selected from the group consisting of iron, nickel, cobalt, copper, silver, tin, cadmium, lead, and bismuth.

11. The process described in claim 2 in which the catalyst is prepared by partially reducing a chromate of a hydrogenating metal selected from the group consisting of iron, nickel, cobalt, copper, silver, tin, cadmium, lead, and bismuth by heating it to its decomposition temperature.

12. The process described in claim 2 in which the catalyst is prepared by partially reducing copper chromate.

13. The process described in claim 2 in which the catalyst is prepared by partially reducing copper chromate by heating the copper chromate to its decomposition temperature.

14. The process of hydrogenating furfural which comprises reacting furfural and hydrogen in the presence of a catalyst prepared by partially reducing a composition comprising essentially an oxide of a hydrogenating metal selected from the group consisting of iron, nickel, cobalt, copper, silver, tin, cadmium, lead, and bismuth combined with an oxide of a metal selected from the group consisting of chromium, molybdenum, tungsten, vanadium, and uranium.

15. The process of hydrogenating furfural which comprises reacting furfural in the liquid state and hydrogen in the presence of a catalyst prepared by partially reducing a composition comprising essentially an oxide of a hydrogenating metal selected from the group consisting of iron, nickel, cobalt, copper, silver, tin, cadmium, lead, and bismuth combined with an oxide of a metal selected from the group consisting of chromium, molybdenum, tungsten, vanadium, and uranium.

16. The process of hydrogenating furfural which comprises reacting furfural and hydrogen in the presence of a catalyst prepared by partially reducing a composition comprising essentially an oxide of a hydrogenating metal selected from the group consisting of iron, nickel, cobalt, copper, silver, tin, cadmium, lead, and bismuth combined with an oxide of a metal selected from the group consisting of chromium, molybdenum, tungsten, vanadium and uranium, under a superatmospheric pressure and at a temperature in excess of 80° C.

17. The process of hydrogenating furfural which comprises reacting furfural in the liquid state and hydrogen in the presence of a catalyst prepared by partially reducing a composition comprising essentially an oxide of a hydrogenating metal selected from the group consisting of iron, nickel, cobalt, copper, silver, tin, cadmium, lead, and bismuth combined with an oxide of a metal selected from the group consisting of chromium, molybdenum, tungsten, vanadium, and uranium, under a superatmospheric pressure and at a temperature in excess of 80° C.

18. A process of hydrogenating unsaturated fatty oils, comprising passing hydrogen into a liquid body of the oil to be hydrogenated and having in suspension a catalyst composed of metallic nickel intimately associated with and adherently supported on chromium oxide and formed by reduction of a substance having substantially the empirical formula $Ni_2Cr_2O_5$.

19. A process of hydrogenating unsaturated fatty oils, comprising passing hydrogen into a liquid body of the oil to be hydrogenated and having in suspension a catalyst composed of metallic nickel intimately associated with and adherently supported on chromium oxide and formed by reduction of a nickel-chromite.

20. A process of hydrogenating unsaturated fatty oils, comprising passing hydrogen into a liquid body of the oil to be hydrogenated and having in suspension a catalyst composed of metallic nickel intimately associated with and adherently supported on chromium oxide and formed by reduction of a nickel chromium-oxygen compound corresponding empirically in composition to nickel chromite and having a nickel-chromium ratio of 1:1.

21. The process of hydrogenating an organic compound which is structurally capable of hydrogenation, comprising contacting such compound in the liquid phase in the presence of a catalyst comprising essentially chromium oxide chemically combined with copper.

22. The process of hydrogenating an organic compound which is structurally capable of hydrogenation, comprising contacting such compound in the liquid phase in the presence of hydrogen with a catalyst which is prepared by heating copper chromate to its decomposition temperature, whereby the chromate is decomposed to a chromite.

23. The method of making nickel catalyst for hydrogenation of unsaturated fatty oils and the like which comprises preparing a nickel chromate from an aqueous solution containing a nickel sulfate and a soluble chromate, thoroughly washing the precipitate with water, heating the precipitated nickel chromate to convert the chromate to chromite and reducing such chromite at superatmospheric temperature with hydrogen.

24. The process for the hydrogenation of furfural which comprises heating a mixture of furfural, water and hydrogen, while in intimate contact with a hydrogenation catalyst, to a temperature of 80° to 110° C. and under a hydrogen pressure of 1400 pounds per square inch, said hydrogenation catalyst being prepared by reducing nickel chromate to nickel chromite with hydrogen at a temperature of 450° to 500° C.

25. The process of hydrogenating furfural which comprises reacting furfural in the liquid state with hydrogen in the presence of a catalyst prepared by partially reducing nickel chromate.

26. The process of hydrogenating furfural which comprises reacting furfural in the liquid state with hydrogen in the presence of a catalyst comprising essentially nickel chromite.

27. The process of hydrogenating furfural which comprises reacting furfural in the liquid state with hydrogen in the presence of a catalyst prepared by heating nickel chromate to a temperature of 400° C. and then reducing the resulting composition with hydrogen at 500° C.

28. The process of hydrogenating furfural which comprises reacting furfural in the liquid state with hydrogen under a superatmospheric pressure and in the presence of a catalyst prepared by partially reducing nickel chromate.

29. The process of hydrogenating furfural which comprises reacting furfural in the liquid state with hydrogen under a superatmospheric pressure and in the presence of a catalyst comprising essentially nickel chromite.

WILBUR A. LAZIER.